(12) United States Patent
Moriguchi

(10) Patent No.: US 10,317,530 B2
(45) Date of Patent: Jun. 11, 2019

(54) LASER RANGE FINDING APPARATUS

(71) Applicant: DENSO CORPORATION, Kariya, Aichi-pref. (JP)

(72) Inventor: Chihiro Moriguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 394 days.

(21) Appl. No.: 15/189,652

(22) Filed: Jun. 22, 2016

(65) Prior Publication Data

US 2016/0377719 A1  Dec. 29, 2016

(30) Foreign Application Priority Data

Jun. 26, 2015  (JP) ................................. 2015-128882

(51) Int. Cl.
| | |
|---|---|
| *G01C 3/08* | (2006.01) |
| *G01S 17/42* | (2006.01) |
| *G01S 17/93* | (2006.01) |
| *G01S 7/484* | (2006.01) |
| *G01S 7/486* | (2006.01) |

(52) U.S. Cl.
CPC .............. *G01S 17/42* (2013.01); *G01S 7/484* (2013.01); *G01S 7/4865* (2013.01); *G01S 7/4868* (2013.01); *G01S 17/936* (2013.01)

(58) Field of Classification Search
CPC ........ G01S 17/42; G01S 17/936; G01S 7/484; G01S 7/4865; G01S 7/4868

USPC .......................................................... 356/5.01
See application file for complete search history.

(56) References Cited

U.S. PATENT DOCUMENTS

| | | | | |
|---|---|---|---|---|
| 2005/0068517 A1* | 3/2005 | Evans | ..................... | G01S 7/481 |
| | | | | 356/5.01 |
| 2007/0291249 A1* | 12/2007 | Nakamura | .............. | G01S 7/486 |
| | | | | 356/4.01 |
| 2008/0218729 A1 | 9/2008 | Kase | | |
| 2014/0085622 A1 | 3/2014 | Wong | | |
| 2017/0261612 A1* | 9/2017 | Akiyama | .............. | G01S 7/4817 |
| 2018/0106900 A1* | 4/2018 | Droz | ..................... | G01J 1/0411 |

FOREIGN PATENT DOCUMENTS

JP       2008-275331       11/2008

\* cited by examiner

*Primary Examiner* — Mark Hellner
(74) *Attorney, Agent, or Firm* — Knobbe, Martens, Olson & Bear, LLP

(57) ABSTRACT

A laser range finding apparatus includes a light emitting section that emits a laser light, a light receiving section that receives the reflected laser light from a detection object, the light receiving section including a plurality of photo detectors for respectively receiving a plurality of different transmission wavelength bands of the laser light, an identifying section that identifies each of the photo detectors each of whose output indicating signal waveforms of the received reflected laser light is not saturated as an unsaturated photo detector, and a distance calculating section that calculates a distance to the detection object based on a light detection timing at which the reflected laser light is received by the unsaturated photo detector.

10 Claims, 10 Drawing Sheets

OBJECT A

OBJECT B

OBJECT A

OBJECT B

LIGHT RECEIVER LENS ARRAY

LIGHT RECEIVER LENS ARRAY

LASER RANGE FINDING APPARATUS

This application claims priority to Japanese Patent Application No. 2015-128882 filed on Jun. 26, 2015, the entire contents of which are hereby incorporated by reference.

BACKGROUND OF THE INVENTION

1. Field of the Invention

The present invention relates to a technique for measuring a distance to a detection target.

2. Description of Related Art

There is known a technique for calculating a distance to a detection target by emitting laser light and receiving the laser light reflected from the detection target. It is also known to adjust the level of such a reflected laser light being received to enable detecting a detection target with a high degree of accuracy.

For example, Japanese Patent Application Laid-open No. 2008-224239 describes changing the wavelength of a laser light being emitted to prevent the level of a reflected version of the laser light to be received through a bandpass filter from being saturated.

However, the technique described in this patent document has a problem that since feedback control of the temperature of a Peltier element has to be performed to change the wavelength of the laser light, a complicated structure is required. In addition, since feedback control involves a time delay, it is difficult to be used for automobiles.

SUMMARY

An exemplary embodiment provides a laser range finding apparatus including:

a light emitting section that emits a laser light;

a light receiving section that receives reflected laser light reflected from a detection object, the light receiving section including a plurality of photo detectors for respectively receiving a plurality of different transmission wavelength bands of the laser light;

an identifying section that identifies each of the photo detectors each of whose output indicating signal waveforms of the received reflected laser light is not saturated as an unsaturated photo detector; and a distance calculating section that calculates a distance to the detection object based on a light detection timing at which the reflected laser light is received by the unsaturated photo detector.

According to the exemplary embodiment, there is provided a laser range finding apparatus that can accurately measure a distance to a detection object without a time delay and without a complicated structure.

Other advantages and features of the invention will become apparent from the following description including the drawings and claims.

PREFERRED EMBODIMENTS OF THE INVENTION

First Embodiment

Figure 1:
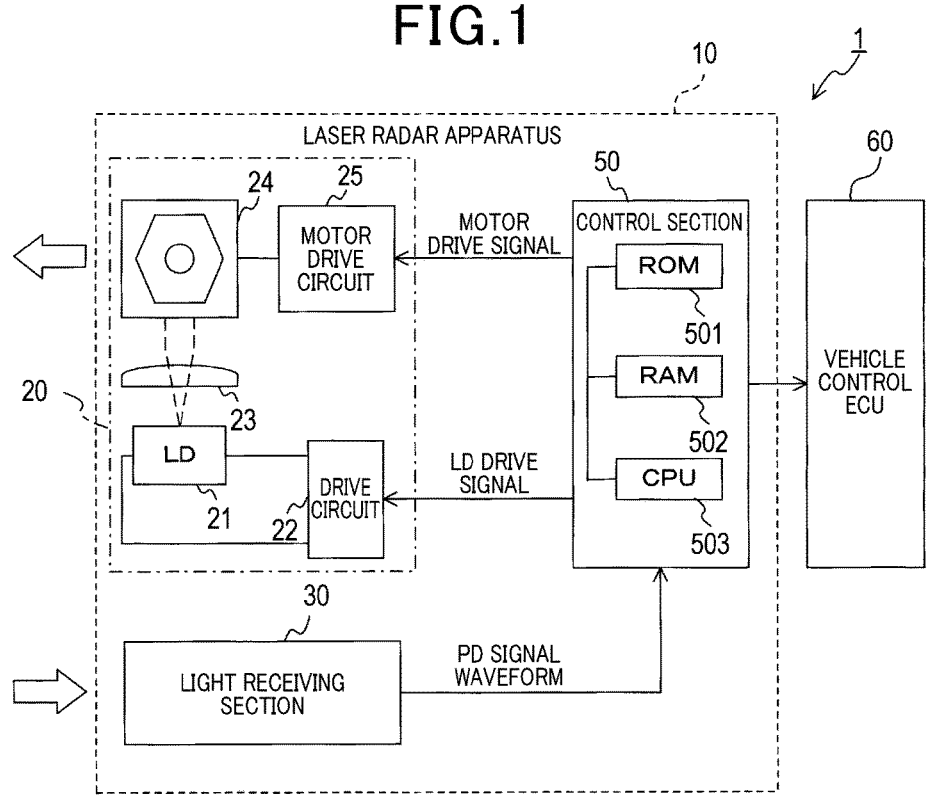
FIG. 1 is a block diagram showing a vehicle control system including a laser radar apparatus as a first embodiment of the invention.

FIG. 1 is a block diagram showing a vehicle control system 1 including a laser radar apparatus 10 as a first embodiment of the invention and a vehicle control ECU 60. The vehicle control system 1 is mounted on an own vehicle to detect an object present ahead of the own vehicle and perform vehicle control in accordance with the result of the detection.

The laser radar apparatus 10 is for measuring a distance to an object present in front of the own vehicle by emitting a laser light ahead of the own vehicle and receiving the laser light reflected from the object. The laser radar apparatus 10 includes a light emitting section 20, a light receiving section 30 and a control section 50.

The light emitting section 20 scans a front area of the own vehicle by emitting the laser light in accordance with a later explained LD drive signal. The light emitting section 20 includes an LD (laser diode) 21, a drive circuit 22, a light emission lens 23, a scanner 24 and a motor drive circuit 25.

Figure 2:
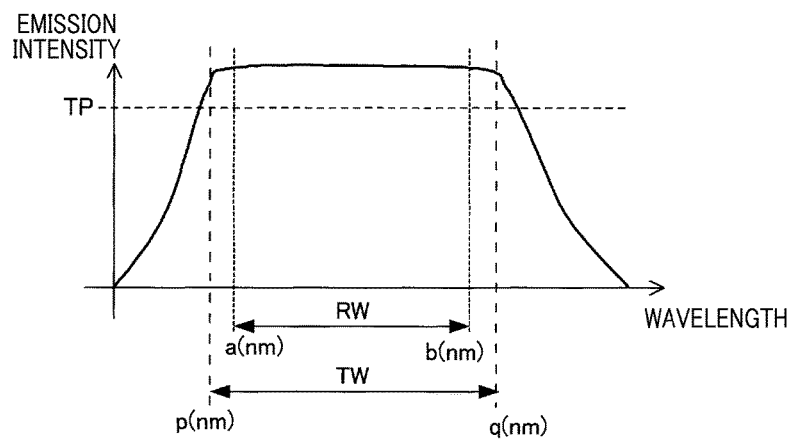
FIG. 2 is a diagram for explaining the light emission performance of a laser diode included in the laser radar apparatus.

The LD 21 generates the laser light. More specifically, the LD 21 emits the laser light whose intensity is higher than a predetermined emission threshold TP over a predetermined emission wavelength band TW from several hundred nm to several thousand nm as shown FIG. 2. The LD 21 may be a single laser light source such as a supercontinuum light source. The emission wavelength band TW is set based on a detection wavelength band RW in the range from several hundred nm to several thousand nm that can be received by the light receiving section 30. As explained later, the detection wavelength band RW includes a plurality of transmission detection wavelength bands W. That is, the emission wavelength band TW is set depending on the detection wavelength band RW. FIG. 2 shows that the emission wavelength band TW is set to include the detection wavelength band RW. However, the setting of the emission wavelength band TW is not limited thereto. For example, the emission wavelength band TW may be set to be the same as the detection wavelength band RW.

The drive circuit 22 causes the LD 21 to generate a pulsed laser light in accordance with the LD drive signal received from the control section 50. The light emission lens 23 narrows the beam width of the laser light generated by the LD 21. The scanner 24 includes a polygon mirror which reflects the laser light emitted therein through the light emission lens 23, and a motor for driving the polygon mirror to rotate. The motor drive circuit 25 drives the motor of the scanner 24 in accordance with a motor driver signal received from the control section 50. Since the emission direction of the laser light (the direction in which the laser light is reflected by the polygon mirror) is changed with the rotation of the polygon mirror, it is possible to scan a predetermined angular range with the laser light.

Figure 3:
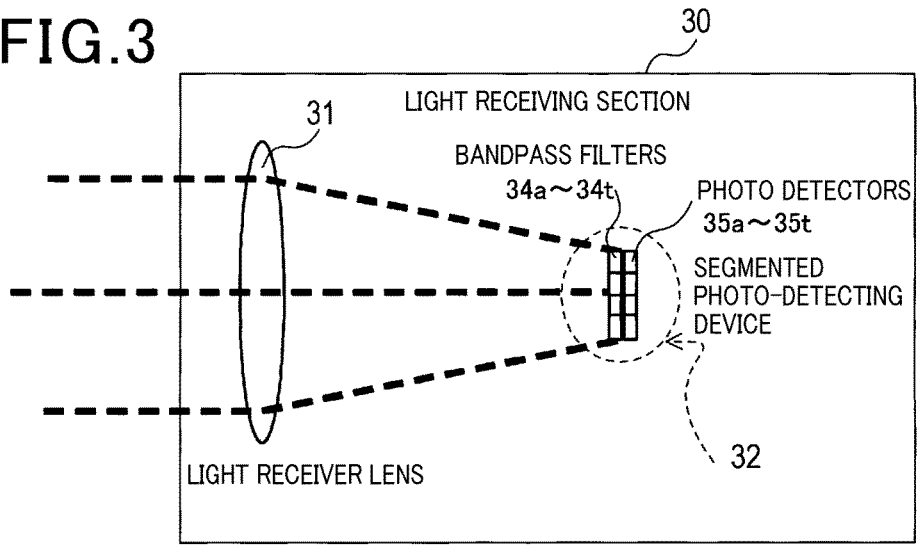
FIG. 3 is a block diagram showing the structure of a light receiving section of the laser radar apparatus.
Figure 4:
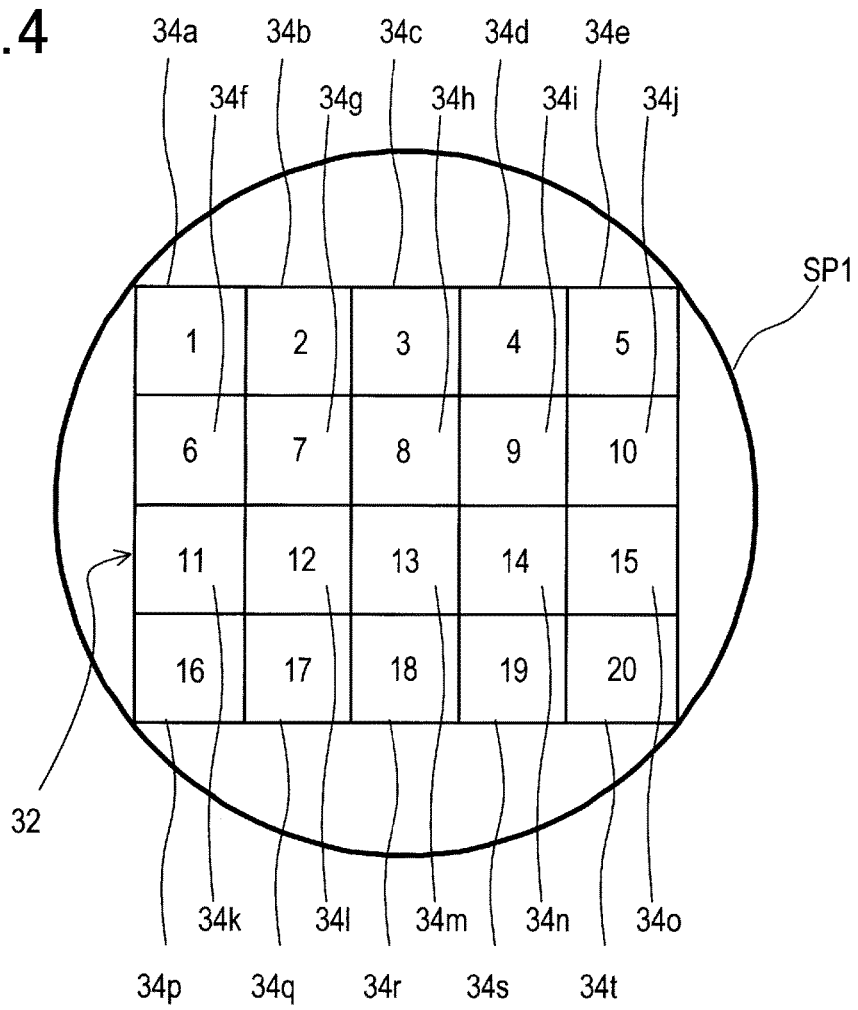
FIG. 4 is a diagram showing a positional relationship between a filter section and a converging spot in the laser radar apparatus.

The light receiving section 30 receives the laser light reflected from a detection object. As shown in FIG. 3, the light receiving section 30 includes a light receiver lens 31 and a segmented photo-detecting device 32. The light receiver lens 31 converges the laser light reflected from the detection object such that the light converging spot SP1 becomes roughly a circle as shown in FIG. 4. Specifically, in this embodiment, the light receiver lens 31 converges the reflected laser light such that the light converging spot SP1 having roughly a circular shape is circumscribed to the segmented photo-detecting device 32.

The segmented photo-detecting device 32 includes a plurality of (twenty, in this embodiment) bandpass filters 34a to 34t and a plurality of (twenty, in this embodiment) photo detectors 35a to 35t. The bandpass filters 34a to 34t are disposed between the light receiver lens 31 and the photo detectors 35a to 35t. In this embodiment, as shown in FIG. 4, the bandpass filters 34a to 34t are arranged in a 5×4 matrix array. The bandpass filters 34a to 34t are different from one another in transmission center wavelength. In this embodiment, as shown in FIG. 5, the transmission center wavelengths of each adjacent two of the bandpass filters 34a to 34t differ from each other by several tens of nm.

Figure 5:
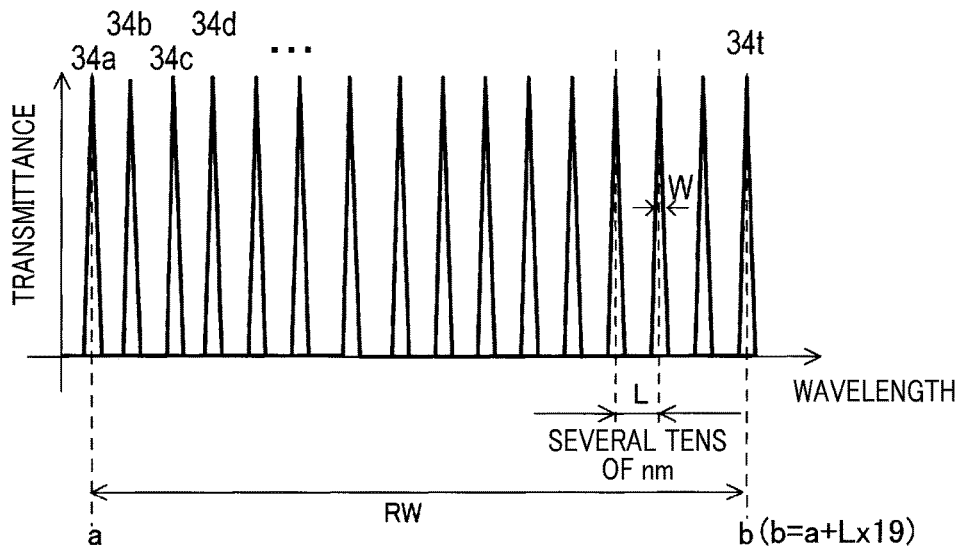
FIG. 5 is a diagram showing the transmission center wavelength of a bandpass filter included in the laser radar apparatus.

In FIG. 5, L is the wavelength interval showing the difference between the transmission center wavelengths of the adjacent bandpass filters, and W is the transmission wavelength band showing the width of the wavelength band in which the ratio of transmittance to the maximum transmittance is above a predetermined value (above ½, for example). That is, the bandpass filters 34a to 34t output the reflected laser lights which are different in transmission wavelength band W to the photo detectors 35a to 35t, while limiting the light detection intensities. The filtering properties of the bandpass filters 34a to 34t may be overlapped with each other or may be isolated from each other in a low transmittance range. In this embodiment, as shown in FIG. 5, the filtering properties of the bandpass filters 34a to 34t are isolated from each other in a low transmittance range so that the light detection intensities are more limited than they are overlapped with each other.

The photo detectors 35a to 35t are photo diodes provided in one-to-one correspondence with the bandpass filters 34a to 34t. Each of the photo detectors 35a to 35t converts the received light into an electrical signal having a magnitude in accordance with the intensity of the received light, and outputs this electrical signal to the control section 50.

In the following, the photo detectors 35a to 35t may be collectively referred to as photo detector(s) 35.

The control section 50 includes a CPU 501, a ROM 502 and a RAM 503. Programs to be executed by the CPU 501 are stored in the ROM 502. The control section 50 drives the light emitting section 20 in accordance with the LD drive signal and the motor drive signal to perform a two-dimensional beam scan process at a predetermined scan period. The scan process is such that the LD drive signal is outputted a predetermined number of times at a certain interval, and the motor drive signal is outputted in synchronization with the LD drive signal so that the emission angle θx of the laser light in the horizontal direction is shifted by a predetermined angle in succession (line scan). The line scan is repeated for each of different values of the depression angle θy of the laser light.

The control section 50 causes the LD 21 to emit the laser light in synchronization with the LD drive signal. Also, the control section 50 measures the time between an emission timing at which the laser light is emitted from the light emitting section 20 and a detection timing at which a reflected version of the laser light is received by the light receiving section 30 based on the LD drive signal and the output signal of the light receiving section 30. The control section 50 performs a range finding process to measure the distance to the detection object that has reflected the laser light based on the result of this measurement. The control section 50 supplies the vehicle control ECU 60 with distance data R showing the measured distance, and the emission angle θx and the depression angle θy associated with the distance data R as range finding data, The vehicle control ECU 60 recognizes the detection object present in front of the own vehicle based on the range finding data supplied from the laser radar apparatus 10, and performs various vehicle controls depending on the recognized object. For example, the vehicle control includes notification control for notifying the vehicle driver of a travel direction to avoid the recognized object and avoidance control for controlling the behavior of the own vehicle to avoid a collision with the recognized object.

Figure 6:
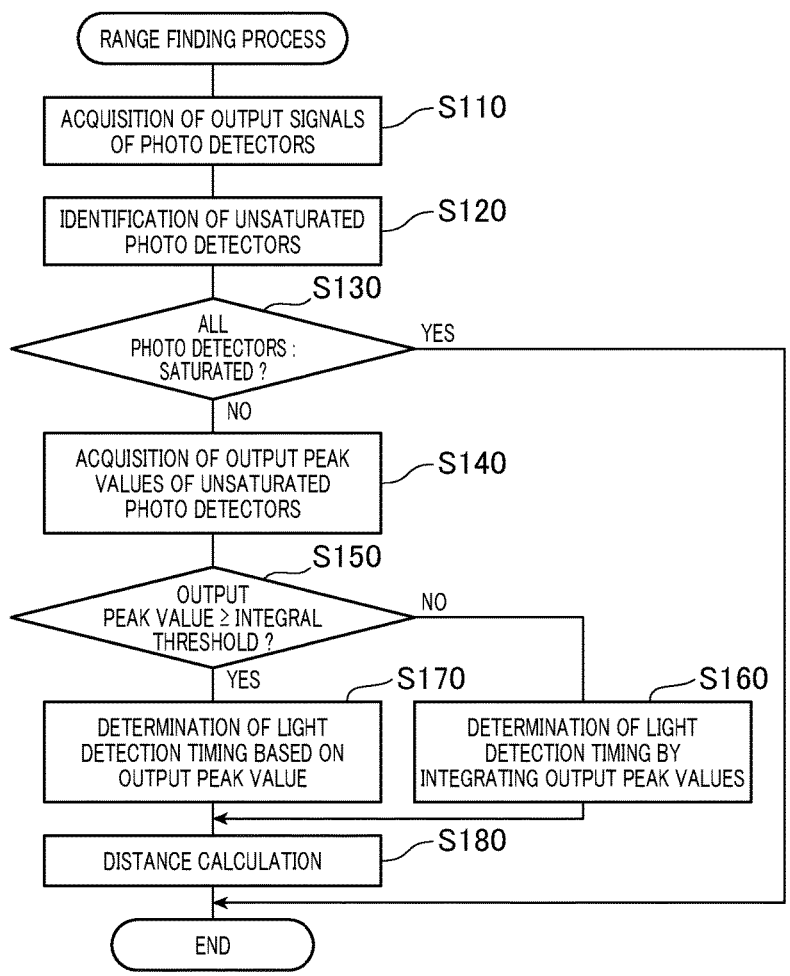
FIG. 6 is a flowchart showing steps of a range finding process performed by the laser radar apparatus.

Next, the range finding process performed by the CPU 501 of the control section 50 is explained with reference to the flowchart of FIG. 6. This process is activated each time the laser light is emitted from the light emitting section 20.

Figure 7A:
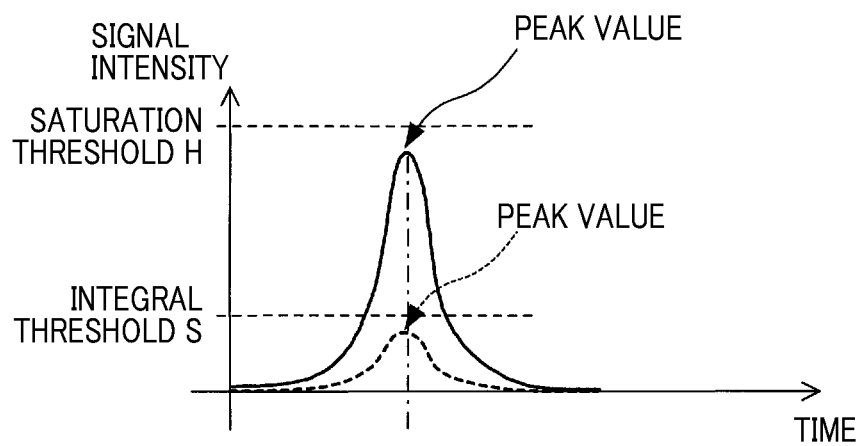
FIG. 7A is a diagram showing the output of an unsaturated photo detector.

This process begins in step S11 where the output signals of the photo detectors 35 are obtained. In subsequent step S120, of the photodetectors 35, the ones (or one) whose output signals indicating their signal waveforms are not saturated are identified as unsaturated photo detectors. In this embodiment, the photo detectors 35 the peak value of whose output signals are smaller than a predetermined saturation threshold H (see FIG. 7A) are identified as the unsaturated photo detectors. The saturation threshold H is set depending on the detection limit of the photo detectors 35. On the other hand, the photo detector (or detectors) 35 the peak value of whose output signal is larger than or equal to the saturation threshold H (see FIG. 7B) is identified as a saturated photo detector.

In subsequent step S130, it is determined whether the outputs of all the photo detectors 35 are saturated, that is, whether all the photo detectors 35 are the saturated photo detectors. If the determination result in step S130 is affirmative, the process is terminated, and otherwise the process proceeds to step S140.

In step S140, of the unsaturated photo detectors identified in step S120, the one whose peak value of the output signal is the largest is identified. In subsequent step S150, it is determined whether or not the peak value of the output signal of the unsaturated photo detector identified in step S140 is larger than or equal to a predetermined integral threshold S. If the determination result in step S150 is affirmative, the process proceeds to step S170, and otherwise proceeds to step S160.

In step S170, the light detection timing is determined based on the timing at which this peak value is obtained. For example, when the peak value of the output exceeds the integral threshold S as shown by the solid line in FIG. 7A, the timing at which this peak value is obtained is determined as the light detection timing.

On the other hand, in step S160, the output signal indicating the signal waveform is integrated for each of the unsaturated photo detectors identified in step S120 to determine the light detection timing. For example, when the peak value of the output does not exceed the integral threshold S as shown by the broken line in FIG. 7A, the timing at which the peak value of the integral of the output (signal waveform) of the unsaturated photo detector is obtained is determined as the light detection timing.

In step S180 subsequent to step S160 or S170, the distance to the object is calculated based on the light detection timing determined in step S160 or S170.

Figure 8A:
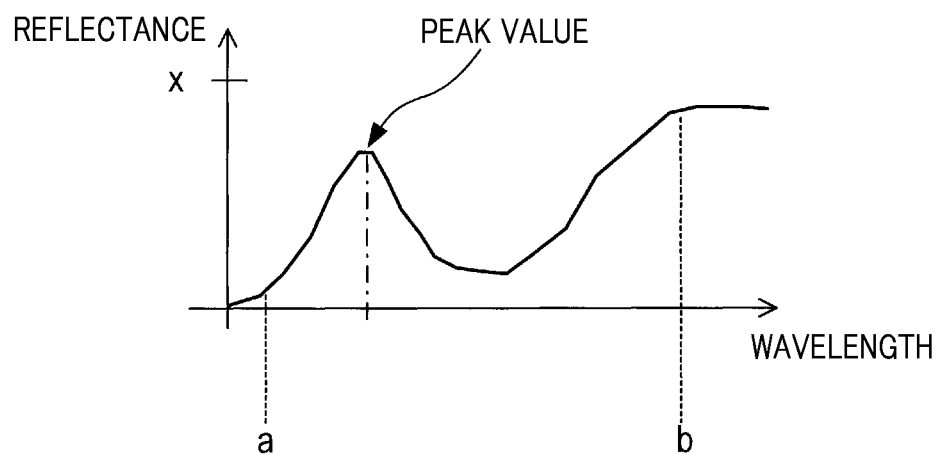
FIG. 8A is a diagram showing wavelength-reflectance properties of an object A.
Figure 8B:
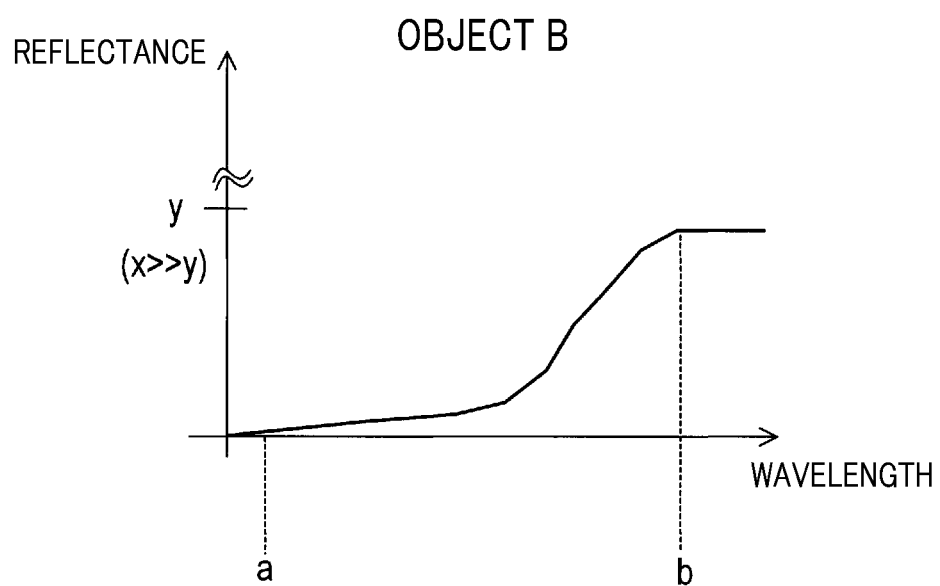
FIG. 8B is a diagram showing wavelength-reflectance properties of an object B.
Figure 9A:
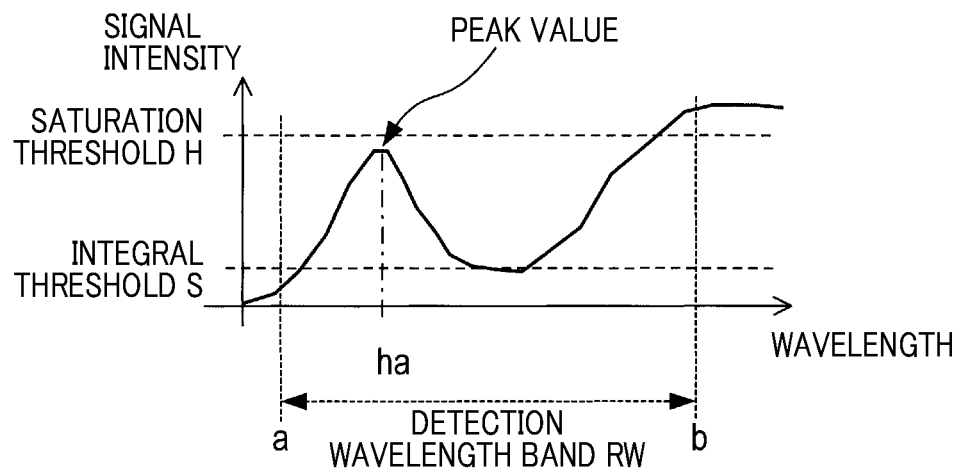
FIG. 9A is a diagram showing wavelength-light detection properties for the object A.
Figure 9B:
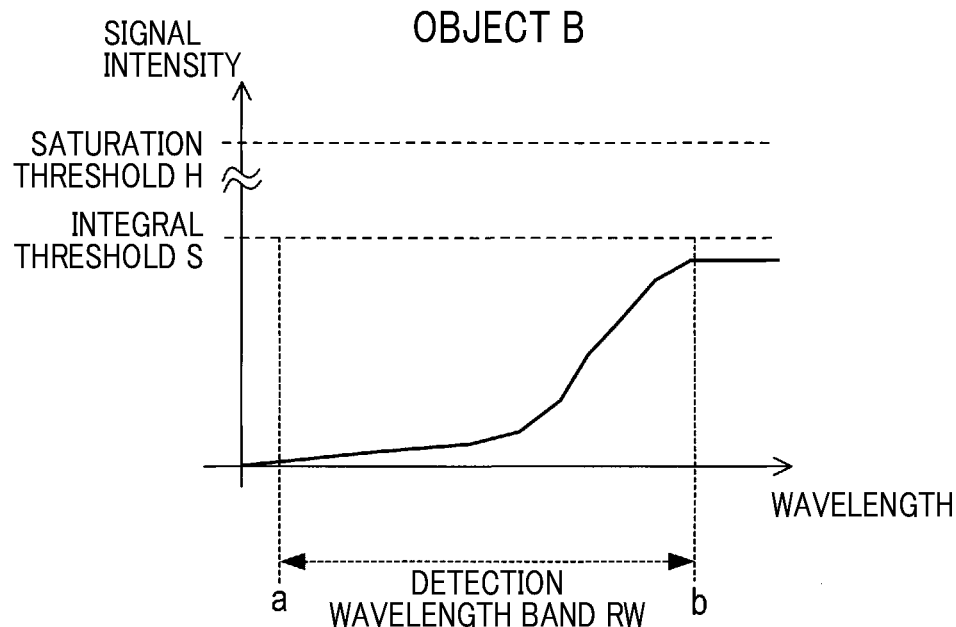
FIG. 9B is a diagram showing wavelength-light detection level properties for the object B.

It is known that any object has particular spectral properties depending on its color, material and so on. Here, it is assumed that an object A has reflectance properties as shown in FIG. 8A and an object B has reflectance properties as shown in FIG. 8B, as spectral properties respectively. FIG. 9A shows an example of the signal waveform for the object A and FIG. 9B shows an example of the signal waveform for the object B.

For the object A, it is assumed that there is a wavelength within the detection wavelength band RW, at which the light detection intensity becomes a peak that is smaller than the saturation threshold H and larger than or equal to the integral threshold S as shown in FIG. 9A. In this assumption, the light detection timing is determined to calculate the distance based on the output of the unsaturated photo detector that has received the reflected laser light of the wavelength ha whose peak value is the largest of all the peak values that are smaller than the saturated threshold H and larger than or equal to the integral threshold S.

For the object B, it is assumed that there is a wavelength within the detection wavelength band RW, at which the detection intensity becomes a peak that is smaller than the saturation threshold H and the integral threshold S. In this assumption, the detection timing is determined to calculate the distance based on the result of integration of the outputs of the unsaturated photo detectors the peak values of whose output are smaller than the integral threshold S.

The first embodiment described above provides the following advantages. Since the reflected laser light is received by the plurality of the photo detectors 35 respectively provided with the bandpass filters 34a to 34t which are different from one another in transmission center frequency, the probability that there is an unsaturated photo detector is high compared to a case where the bandpass filters 34a to 34t have the same transmission center frequency. The distance to a detection object is calculated based on the light detection timing determined based on the output of the unsaturated photo detector. Accordingly, according to the first embodiment, it is possible to find the distance to the object with a high degree of accuracy without any complicated structure.

Further, since the reflected laser light is received by the plurality of the photo detectors 35 provided with the bandpass filters 34a to 34t in one-to-one correspondence which are different in transmission center frequency from one another, it is not necessary to change the wavelength of the laser light by performing feedback control. Therefore, according to the first embodiment, it is possible to find the distance to a detection object without time delay.

Further, according to the first embodiment, even when the output of the photo detector that has received the reflected laser light of a certain wavelength band is saturated, it is possible to find the distance to a detection object if the output of some other photo detector that has received the reflected laser light of another wavelength band is not saturated.

The light emitting section 20 emits the laser light of the emission wavelength band TW set depending on the detection wavelength band RW. The light emitting section 20 may be configured to emit the laser light at an emission intensity higher than a predetermined emission threshold TP over the entire emission wavelength band TW so that the color, material and so on of a detection object can be estimated.

The control section 50 can calculate a distance to a detection object based on the light detection timing of the unsaturated photo detector the peak value of whose output exceeds the predetermined integral threshold S. Therefore, according to the first embodiment, it is possible to determine the detection timing and calculate the distance to the detection object with a high degree of accuracy by integrating the received light for each of the different detection wavelength bands even when the intensity of the received laser light is weak.

The control section 50 can calculate the distance to a detection object based on the light detection timing of one of the unsaturated photo detectors, which is the largest in output peak value. Accordingly, it is possible to determine the light detection timing with a high degree of accuracy to thereby calculate the distance to the detection object with a high degree of accuracy.

When the output peak values of all the unsaturated photo detectors are smaller than the integral threshold S, the control section 50 can determine the light detection timing based on the result of integration of the outputs of these unsaturated photo detectors. Therefore, it is possible to calculate the distance to the detection object even when the outputs of the unsaturated photo detectors are small.

Second Embodiment

Next, a second embodiment of the invention is described with a focus on differences with the first embodiment.

The first embodiment includes the bandpass filters 34a to 34t each of which is for selecting a wavelength of the laser light and limiting the intensity of the laser light to be received by one of the photo detectors 35. The second embodiment includes, instead of such bandpass filters 34a to 34t, a structure which disperses the reflected laser light into different wavelength bands to be respectively received by photo detectors. This structure may be comprised a prism 36 and a segmented photo-detecting device 37 as shown in FIG.

Figure 10A:
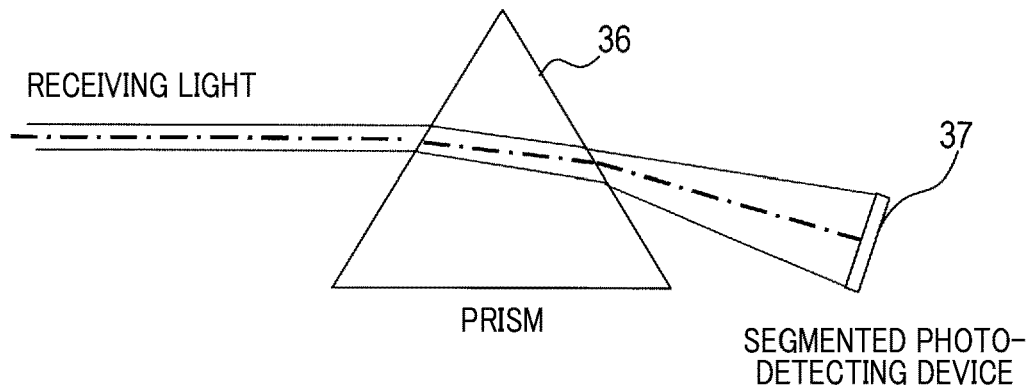
FIG. 10A is a block diagram showing the structure of a light receiving section of a laser radar apparatus as a second embodiment of the invention.
Figure 10B:
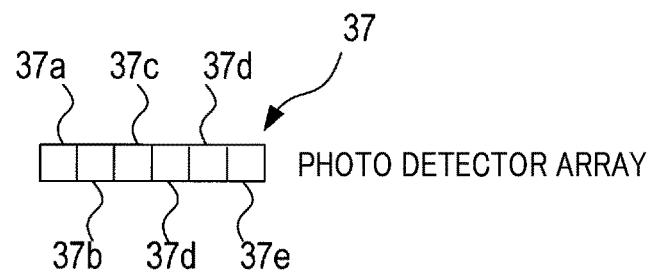
FIG. 10B is a diagram showing the structure of a segmented photo-detecting device of the light receiving section.
Figure 10C:
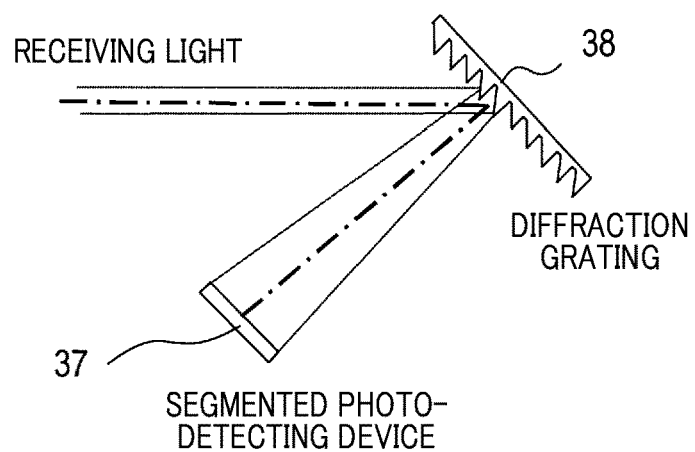
FIG. 10C is a diagram showing a variant of the segmented photo-detecting device.

10A. The segmented photo-detecting device 37 may be comprised of photo detectors 37a to 36e arranged in a line as shown in FIG. 10B. Alternatively, this structure may be comprised of a diffraction grating 38 as shown in FIG. 10C.

According to the second embodiment, advantages similar to the advantages provided by the first embodiment can be provided.

OTHER EMBODIMENTS

It is a matter of course that various modifications can be made to the above described embodiment as described below.

In the above embodiments, a photo detector 35 whose output peak value is smaller than the predetermined saturation threshold H is identified as an unsaturated photo detector. However, the photo detector 35 may be identified as an unsaturated photo detector if the ratio of the half-value width to the output peak value thereof is smaller than a predetermined threshold. Here, the half-value width means the period in which the output of the photo detector 35 exceeds the half of the output peak value thereof.

In this case, instead of the half-value width, any appropriate period in which the output of the photo detector 35 exceeds an appropriate value relative to the output peak value may be used.

Figure 11:
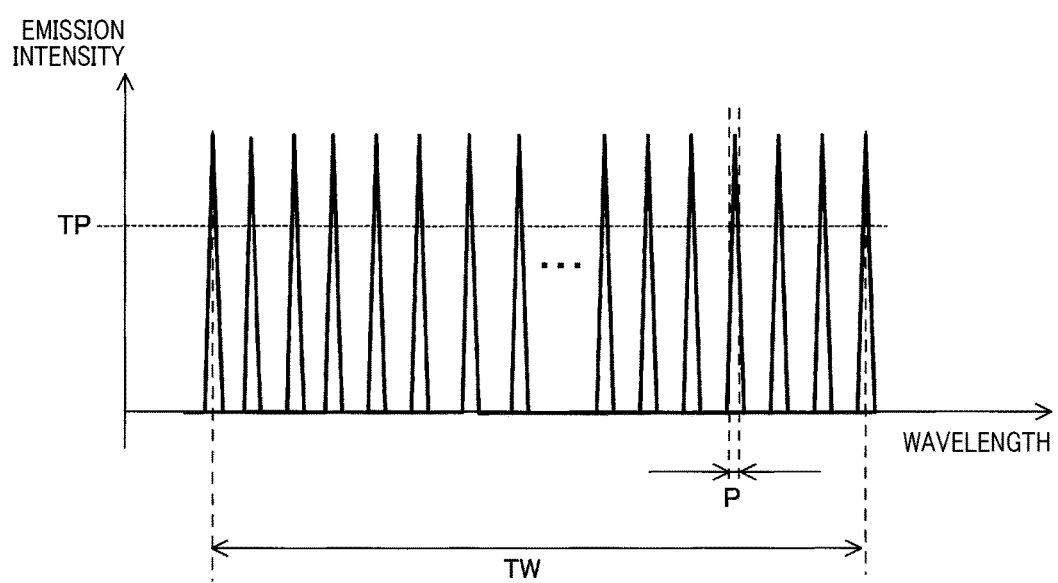
FIG. 11 is a diagram for explaining the light emission performance of a laser diode included in a variant of the light emitting section.

In the above embodiments, the light emitting section 20 emits the laser light of the emission wavelength band TW at intensity higher than the predetermined emission threshold TP over the entire emission wavelength band TW. However, the light emitting section 20 may be configured to emit a laser light whose intensity is higher than the emission threshold TP in each of individual wavelength bands P included in the emission wavelength band TW as shown in FIG. 11.

Figure 12A:
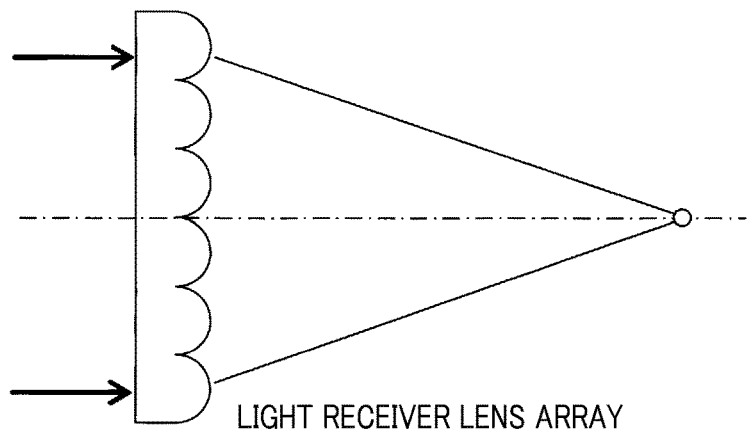
FIG. 12A is a diagram showing a light receiver lens included in a variant of the light receiving section.
Figure 12B:
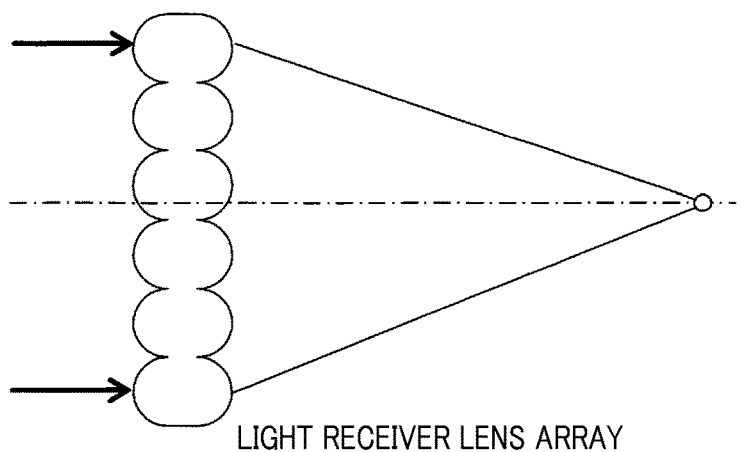
FIG. 12B is a diagram showing a light receiver lens included in another variant of the light receiving section.
Figure 12C:
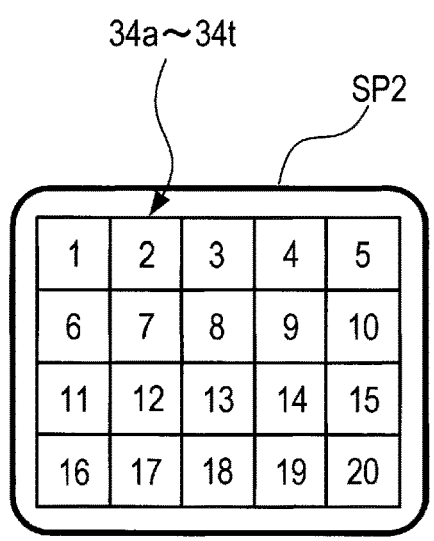
FIG. 12C is a diagram showing a converging spot by theses light receiver lenses.

In the above embodiments, the light receiver lens 31 is a lens that converges the reflected laser light such that the light converging spot becomes roughly a circle. However, the receiver lens 31 may be a plano-convex lens having the cross-sectional shape as shown in FIG. 12A, or a biconvex lens having the cross-sectional shape as shown in FIG. 12B. In these cases, since the reflected laser light is converged to a rectangular light spot SP2, the reflected laser light can be efficiently applied to the photo detectors 35 without waste. As described above, the light receiving section 30 does not necessary have to include such a light receiver lens.

The light receiving section 30 may include amplifiers for amplifying the output signals of the photo detectors 35. The characteristics of the bandpass filters 34a to 35t are not limited to the ones as shown in FIG. 5. The characteristics of the bandpass filters 34a to 35t may be set appropriately depending on the number of the photodetectors 35, the transmission center frequency, the wavelength interval L and the transmission wavelength band W.

In the above embodiments, the light emitting section 20 includes the scanner 24. However, the light emitting section 20 may not include the scanner 24 if the light receiving section 30 is configured to receive the reflected laser light at its photo detectors disposed in array depending on the angular range to be covered. Further, the light receiving section 30 may include photo detectors disposed in array for each of wavelengths to be received.

In the above embodiments, if all the photo detectors 35 are determined to be saturated (YES in step S130), the range finding process is terminated. However, the above embodiments may be modified such that even if all the photo detectors 35 are determined to be saturated, the range finding process is continued by some other measures.

Figure 7B:
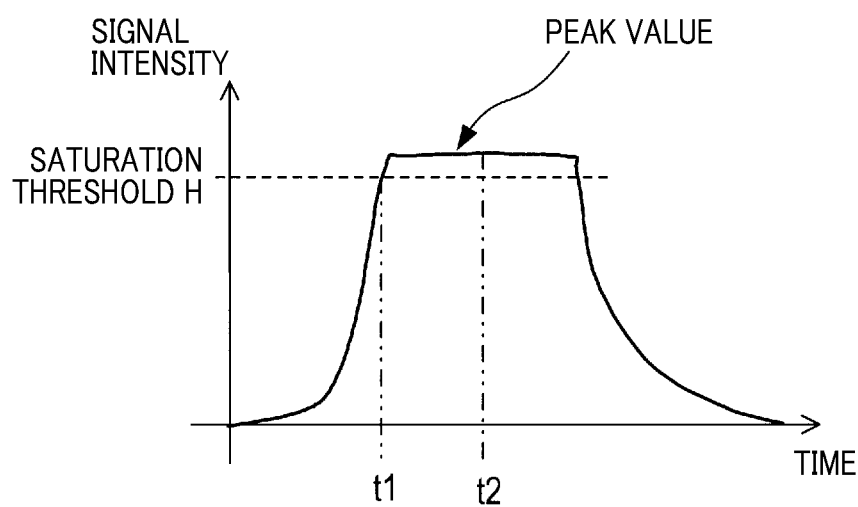
FIG. 7B is a diagram showing the output of a saturated photo detector.

For example, if all the photo detectors 35 are determined to be saturated as shown in FIG. 7B, the distance to the detection object may be calculated by setting any timing during a period in which the output peak value of the photo detector is larger than the saturation threshold H as the light detection timing. For example, the timing t1 at which the peak value exceeds the saturation threshold H, or the timing t2 which is at the center of the period in which the peak value is above the saturation threshold H may be set as the light detection timing.

Figure 13:
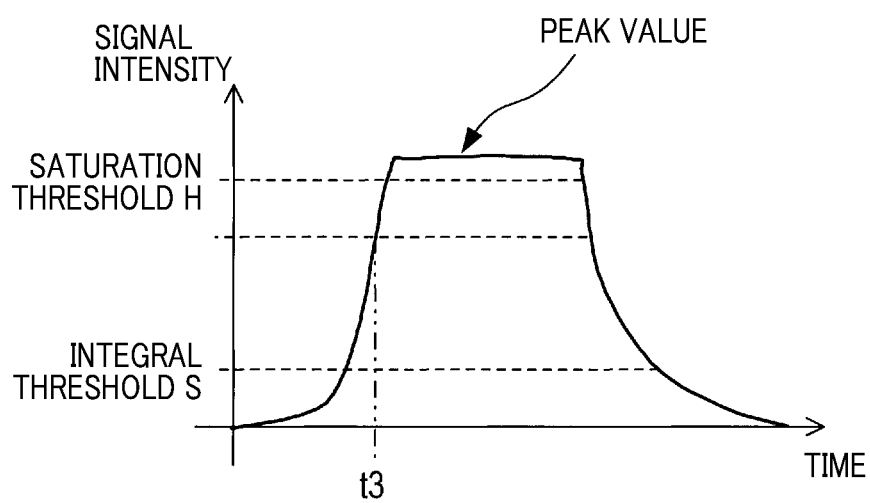
FIG. 13 is a diagram for explaining a range finding process when all the photo detectors of the light receiving section are saturated.

Further, as shown in FIG. 13, the timing t3 at which the peak value exceeds a predetermined threshold I larger than the integral threshold S and smaller than the saturation threshold H (H>I>S) may be set to be the light detection timing.

In a case where the own vehicle is provided with an image processing device for image-processing an image captured by a vehicle mounted camera or another range finding apparatus such as a millimeter-wave radar device, the distance to a detection object may be obtained from these devices.

The present invention may be performed by executing programs which are stored in a storage medium to implement the functions of the vehicle control system 1, the laser radar apparatus 10, the control section 50 and so on.

The above explained preferred embodiments are exemplary of the invention of the present application which is described solely by the claims appended below. It should be understood that modifications of the preferred embodiments may be made as would occur to one of skill in the art.

What is claimed is:

1. A laser range finding apparatus comprising:
   a light emitting section that emits a laser light;
   a light receiving section that receives reflected laser light reflected from a detection object, the light receiving section including a plurality of photo detectors for respectively receiving a plurality of different transmission wavelength bands of the laser light;
   an identifying section that identifies each of the photo detectors each of whose output indicating signal waveforms of the received reflected laser light is not saturated as an unsaturated photo detector; and
   a distance calculating section that calculates a distance to the detection object based on a light detection timing at which the reflected laser light is received by the unsaturated photo detector, wherein
   the light emitting section emits the laser light of an emission wavelength band set corresponding to the different transmission wavelength bands such that light emission intensity is higher than a predetermined emission threshold in each of individual wavelength bands included in the emission wavelength band.

2. The laser range finding apparatus according to claim 1, wherein the light receiving section includes an input section disposed closer to the detection object than the photo detectors are, the input section allowing each of components of the transmission wavelength bands of the reflected laser light to transmit therethrough to be applied to a corresponding one of the photo detectors.

3. The laser range finding apparatus according to claim 1, wherein the light receiving section includes an input section that disperses the reflected laser light into components of the transmission wavelength bands and inputting each of the components to a corresponding one of the photo detectors.

4. The laser range finding apparatus according to claim 1, wherein the light emitting section emits the laser light of an emission wavelength band set corresponding to the different transmission wavelength bands such that light emission intensity is higher than a predetermined emission threshold over the emission wavelength band.

5. The laser range finding apparatus according to claim 1, wherein the distance calculating section calculates the distance to the detection object based on the light detection timing of the unsaturated photodetector a peak value of whose output exceeds a predetermined threshold.

6. The laser range finding apparatus according to claim 5, wherein the distance calculating section calculates the distance to the detection object based on the light detection timing of one of the unsaturated photodetectors which is the largest in output peak value.

7. The laser range finding apparatus according to claim 1, wherein, if output peak values of all of the unsaturated photo detectors are smaller than a predetermined threshold, the distance calculating section determines the light detection timing based on an integral of outputs of all of the unsaturated photo detectors.

8. A laser range finding apparatus comprising:
a light emitting section that emits a laser light;
a light receiving section that receives reflected laser light reflected from a detection object, the light receiving section including a plurality of photo detectors for respectively receiving a plurality of different transmission wavelength bands of the laser light;
an identifying section that identifies each of the photo detectors each of whose output indicating signal waveforms of the received reflected laser light is not saturated as an unsaturated photo detector; and
a distance calculating section that calculates a distance to the detection object based on a light detection timing at which the reflected laser light is received by the unsaturated photo detector, wherein
the light emitting section emits the laser light of an emission wavelength band set corresponding to the different transmission wavelength bands such that light emission intensity is higher than a predetermined emission threshold over the emission wavelength band.

9. A laser range finding apparatus comprising:
a light emitting section that emits a laser light;
a light receiving section that receives reflected laser light reflected from a detection object, the light receiving section including a plurality of photo detectors for respectively receiving a plurality of different transmission wavelength bands of the laser light;
an identifying section that identifies each of the photo detectors each of whose output indicating signal waveforms of the received reflected laser light is not saturated as an unsaturated photo detector; and
a distance calculating section that calculates a distance to the detection object based on a light detection timing at which the reflected laser light is received by the unsaturated photo detector, wherein
the distance calculating section calculates the distance to the detection object based on the light detection timing of one of the unsaturated photodetectors which is the largest in output peak value and which the peak value of whose output exceeds a predetermined threshold.

10. A laser range finding apparatus comprising:
a light emitting section that emits a laser light;
a light receiving section that receives reflected laser light reflected from a detection object, the light receiving section including a plurality of photo detectors for respectively receiving a plurality of different transmission wavelength bands of the laser light;
an identifying section that identifies each of the photo detectors each of whose output indicating signal waveforms of the received reflected laser light is not saturated as an unsaturated photo detector; and
a distance calculating section that calculates a distance to the detection object based on a light detection timing at which the reflected laser light is received by the unsaturated photo detector, wherein
if output peak values of all of the unsaturated photo detectors are smaller than a predetermined threshold, the distance calculating section determines the light detection timing based on an integral of outputs of all of the unsaturated photo detectors.

* * * * *